(12) United States Patent
Okamoto

(10) Patent No.: US 7,545,441 B2
(45) Date of Patent: Jun. 9, 2009

(54) DIGITAL BROADCAST RECEIVER

(75) Inventor: Kenji Okamoto, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 939 days.

(21) Appl. No.: 11/028,626

(22) Filed: Jan. 5, 2005

(65) Prior Publication Data

US 2005/0149985 A1    Jul. 7, 2005

(30) Foreign Application Priority Data

Jan. 6, 2004    (JP)    ............................. 2004-001081

(51) Int. Cl.
*H04N 7/00* (2006.01)
*H04N 11/00* (2006.01)
*H04N 5/46* (2006.01)
*H04N 5/445* (2006.01)
*H04N 5/50* (2006.01)

(52) U.S. Cl. ........................ 348/569; 348/460; 348/465; 348/556; 348/561; 348/564; 725/47

(58) Field of Classification Search ................. 348/460, 348/465, 466, 555, 556, 580, 581, 561, 563, 348/564, 569; 345/660; 725/47, 131, 139, 725/151
See application file for complete search history.

(56) References Cited

U.S. PATENT DOCUMENTS

| | | | | |
|---|---|---|---|---|
| 5,784,123 A | * | 7/1998 | Yoshimi | 348/556 |
| 5,815,216 A | * | 9/1998 | Suh | 348/588 |
| 5,900,915 A | * | 5/1999 | Morrison | 725/44 |
| 6,137,539 A | * | 10/2000 | Lownes et al. | 348/569 |
| 6,151,078 A | * | 11/2000 | Yoneda et al. | 348/558 |
| 6,384,870 B1 | * | 5/2002 | Kempisty | 348/569 |
| 6,577,350 B1 | * | 6/2003 | Proehl et al. | 348/564 |

(Continued)

FOREIGN PATENT DOCUMENTS

JP    05-075944    3/1993

(Continued)

OTHER PUBLICATIONS

Notice of the Reason for Refusal dated May 15, 2007 with an English translation (Six (6) pages).

(Continued)

*Primary Examiner*—Brian P Yenke
(74) *Attorney, Agent, or Firm*—Crowell & Moring LLP

(57) ABSTRACT

A microprocessor in a digital broadcast receiver outputs image data displaying a menu in a sub-screen when instructed by a user to display the menu: if received broadcast signals are those of an HD broadcast, and if the image format of a television, to which data are output, is 1080*i* or higher, and further if the screen size of the television, to which data are output, is 37 inch or larger; namely if characters in the menu are unlikely to be corrupted even when the television displays the menu in the sub-screen, and if there is no possibility that characters in the menu become too small to be identifiable. Thereby, it becomes possible for the television to display the menu in the sub-screen if the user can identify characters in the menu even when the television displays the menu in the sub-screen. Accordingly, the user can input setting of menu items while watching broadcast images.

4 Claims, 10 Drawing Sheets

U.S. PATENT DOCUMENTS

| | | | |
|---|---|---|---|
| 6,690,425 B1 * | 2/2004 | Worrell | 348/445 |
| 6,707,504 B2 * | 3/2004 | Chung | 348/569 |
| 6,714,254 B2 * | 3/2004 | Enomoto | 348/564 |
| 6,750,918 B2 * | 6/2004 | Aneja et al. | 348/569 |
| 6,873,368 B1 * | 3/2005 | Yu et al. | 348/441 |
| 6,965,415 B2 * | 11/2005 | Lundblad et al. | 348/556 |
| 7,017,177 B1 * | 3/2006 | Funakoshi | 725/118 |
| 7,061,544 B1 * | 6/2006 | Nonomura et al. | 348/568 |
| 7,061,545 B1 * | 6/2006 | Kweon et al. | 348/569 |
| 7,193,658 B2 * | 3/2007 | Jang | 348/555 |
| 7,202,912 B2 * | 4/2007 | Aneja et al. | 348/569 |
| 7,206,025 B2 * | 4/2007 | Choi | 348/441 |
| 7,206,029 B2 * | 4/2007 | Cohen-Solal | 348/565 |
| 7,212,218 B2 * | 5/2007 | Suzuki et al. | 345/660 |

FOREIGN PATENT DOCUMENTS

| | | |
|---|---|---|
| JP | 11-69251 A | 3/1999 |
| JP | 11-164201 A | 6/1999 |
| JP | 2002-10160 A | 1/2002 |
| JP | 2002-247474 A | 8/2002 |

OTHER PUBLICATIONS

Notice of the Reason for Refusal dated Jun. 24, 2008 including English translation (Three (3) pages).

* cited by examiner

| IMAGE FORMAT | ASPECT RATIO | HORIZONTAL PIXELS × VERTICAL PIXELS |
|---|---|---|
| 480I | 4:3 | 640 × 480 |
|  | 16:9 | 720 × 480 |
| 480P | 4:3 | 640 × 480 |
|  | 16:9 | 720 × 480 |
| 720P | 16:9 | 1280 × 720 |
| 1080I | 16:9 | 1920 × 1080 |
| 1080P | 16:9 | 1920 × 1080 |

FIG. 9

CONNECTED DEVICE
INFORMATION TABLE 70

| GUID | DEVICE INFORMATION |
|---|---|
| A | a |
| B | b |
| C | c |
| D | d |
| E | e |
| F | f |
| G | g |

DIGITAL BROADCAST RECEIVER

BACKGROUND OF THE INVENTION

1. Field of the Invention

The present invention relates to a digital broadcast receiver for receiving digital broadcast signals such as terrestrial digital broadcast signals, BS (Broadcast Satellite) digital broadcast signals and CS (Communication Satellite) digital broadcast signals, and more particularly to a digital broadcast receiver having an OSD (On Screen Display) function.

2. Description of the Related Art

It is known that a conventional digital broadcast receiver for e.g. terrestrial digital broadcast can receive not only SD (Standard Definition) broadcast signals which are low resolution signals like analog broadcast signals, but also HD (High Definition) broadcast signals which are high resolution signals, and that the conventional digital broadcast receiver can output image data of high resolution to an HDTV (High Definition Television). The HDTV has an image format of 1080i (1920 horizontal pixels by 1080 vertical pixels, "i" standing for interlaced), and thus has the number of pixels more than four times as large as that of an SDTV (Standard Definition Television) for analog broadcast which has an image format of 480i (640 or 720 horizontal pixels by 480 vertical pixels), so that the HDTV can display images with a resolution of more than four times as high as that of the SDTV.

When receiving broadcast signals, the conventional digital broadcast receiver sends menu image data of common format to a television receiver, regardless of the resolution of the received broadcast signals and the resolution of the television receiver. More specifically, the conventional digital broadcast receiver generally outputs menu image data for various settings to the television receiver in full screen display format, regardless of the resolution of images on the television receiver and regardless of the screen size of the television receiver.

However, the conventional digital broadcast receiver has the following problems. According to the digital broadcast receiver as described above in which menu image data are unconditionally sent to the television receiver in full screen display format, it is unavoidable that the menu image data are sent to the television receiver in full screen display format even if the image resolution on the television receiver is high, and the screen size of the television receiver is large. Note here that if the received broadcast signals are those of HD broadcast, and if the television receiver is HDTV, characters in a menu image are unlikely to be corrupted or unidentifiable even when displayed by OSD (On Screen Display) in a sub-screen which is a smaller screen superimposed on a full screen. Accordingly, it practically does not cause any problems to display a menu image in a sub-screen by OSD if the screen size of the television receiver is large (for example 37 inch or larger). Thus, the conventional digital broadcast receiver has a problem that a user cannot input setting of menu items while watching broadcast images even in the case where it does not cause any problems to display a menu image in a sub-screen by OSD, because menu image data are unconditionally output to the television receiver in full screen display format.

Japanese Laid-open Patent Publication Hei 5-75944 discloses a digital broadcast receiver in which menu image data for various settings are sent to a television receiver in sub-screen display format, regardless of the resolution of images on the television receiver and regardless of the screen size of the television receiver. However, according to the digital broadcast receiver disclosed in this patent publication, it is unavoidable that the menu image data are sent to the television receiver in sub-screen display format even if the image resolution on the television is low. Accordingly, it has a problem that characters in a menu image displayed in the sub-screen are likely to be corrupted, and it is difficult for a user to identify characters in the menu image. In addition, the digital broadcast receiver disclosed in the above patent publication has a problem that it is further difficult for a user to identify characters in the menu image, because it is unavoidable that the menu image data are sent to the television receiver in sub-screen display format even if the screen size of the television receiver is small, and hence the size of the characters in the menu image displayed in the sub-screen becomes smaller.

SUMMARY OF THE INVENTION

An object of the present invention is to provide such a digital broadcast receiver, such that a display device can display a menu image in a sub-screen if a user can identify characters in the menu image even when displayed in the sub-screen, thereby enabling the user to input setting of menu items as much as possible while watching broadcast images, and such that characters in the menu image can be prevented from becoming unidentifiable.

According to a first aspect of the present invention, this object is achieved by a digital broadcast receiver comprising: a tuner for selectively receiving broadcast signals of a certain channel from digital broadcast signals coded and compressed by and transmitted from a broadcast station; a decoder for decoding the broadcast signals received by the tuner, and for outputting image data and audio data corresponding to the broadcast signals; a memory for storing various data including broadcast data having the image data and the audio data output from the decoder; an OSD (On Screen Display) circuit for storing and outputting data of a menu image to be superimposed, for display, on a display image based on the image data; an input device for inputting various commands, including inputting a command for commanding to superimpose, for display, the menu image on the display image based on the image data; a synthesizing circuit for synthesizing the image data stored in the memory with the data of the menu image output from the OSD circuit so as to output a synthesized image data; an output terminal for outputting the synthesized image data, synthesized by the synthesizing circuit, to a display device such as a television receiver; and a microprocessor for controlling the digital broadcast receiver in its entirety including the decoder, the memory, the OSD circuit and the synthesizing circuit.

When the microprocessor is commanded by the input device to superimpose, for display, the menu image on the display image based on the image data, the microprocessor controls to be able to output an image data displaying the menu image in a sub-screen to the display device via the output terminal if the broadcast signals received by the tuner are those of HD (High Definition) broadcast, while the microprocessor controls to unconditionally output an image data displaying the menu image on a full screen to the display device via the output terminal if the broadcast signals received by the tuner are those of SD (Standard Definition) broadcast.

The digital broadcast receiver according to the first aspect of the present invention has the following advantages. The microprocessor controls to be able to output an image data displaying the menu image in a sub-screen to the display device via the output terminal in the case where the broadcast signals received by the tuner are those of HD broadcast, that is a high resolution broadcast, when the microprocessor is commanded by the input device to superimpose, for display, the menu image on the display image based on the image data. This is because in such case, characters in the menu image are unlikely to be corrupted even when the display device displays the menu image in the sub-screen.

On the other hand, the microprocessor controls to unconditionally output an image data displaying the menu image on a full screen to the display device via the output terminal in the case where the broadcast signals received by the tuner are those of SD broadcast, that is a low resolution broadcast, when the microprocessor is commanded by the input device to superimpose, for display, the menu image on the display image based on the image data. This is because in such case, characters in the menu image are likely to be corrupted when the display device displays the menu image in the sub-screen.

Thus, in the case where a user can identify characters in the menu image even when displayed in the sub-screen, the display device can display a menu image in the sub-screen. Accordingly, the user can input setting of menu items as much as possible while watching broadcast images, and it is possible as well to prevent characters in the menu image from becoming unidentifiable.

Preferably, when the microprocessor is commanded by the input device to superimpose, for display, the menu image on the display image based on the image data, the microprocessor controls to output the image data displaying the menu image in the sub-screen to the display device via the output terminal if the broadcast signals received by the tuner are those of HD broadcast, and if image format of the display device is one that has a resolution of 1080i (1080 interlaced) or higher, and further if screen size of the display device is 37 inch or larger.

Thus, the display device displays a menu image in the sub-screen: if the broadcast signals received by the tuner are those of an HD broadcast, and if the image format of the display device is one that has a resolution of 1080i or higher, and further if the screen size of the display device is 37 inch or larger; namely if characters in the menu image are unlikely to be corrupted even when the display device displays the menu image in the sub-screen, and if there is no possibility that characters in the menu image become too small to be identifiable.

Thus, in the case where a user can identify characters in the menu image even when displayed in the sub-screen, the display device can display a menu image in the sub-screen. Accordingly, the user can input setting of menu items as much as possible while watching broadcast images.

Further preferably, the microprocessor acquires, from the display device, information about the display device including the image format and the screen size, and stores the information of the image format and the screen size in the memory, wherein when the microprocessor is commanded by the input device to superimpose, for display, the menu image on the display image based on the image data, the microprocessor determines, based on the information of the image format and the screen size, whether or not the image format of the display device is one that has a resolution of 1080i or higher, and whether or not the screen size of the display device is 37 inch or larger.

Furthermore, the digital broadcast receiver can be a receiver for receiving terrestrial digital broadcast signals.

It is also possible that the input device is used to input commands to select whether to display the menu image in the sub-screen or to display the menu image on the full screen: wherein the microprocessor accepts input of a command to select to display the menu image in the sub-screen in the case where the image format of the display device is 1080i or higher; wherein the microprocessor writes, into the memory, a menu-display-method setting data to display the menu image in the sub-screen in the case of accepting the input of the command, while the microprocessor writes, into the memory, a menu-display-method setting data to display the menu image on the full screen in the case of not accepting the input of the command, and in the case where it is selected by the input device to display the menu image on the full screen; and wherein when the microprocessor is commanded by the input device to superimpose, for display, the menu image on the display image based on the image data, the microprocessor controls to output the image data displaying the menu image in a sub-screen to the display device via the output terminal if the broadcast signals received by the tuner are those of HD broadcast, and if the menu-display-method setting data written into the memory is the menu-display-method setting data to display the menu image in the sub-screen, while the microprocessor controls to unconditionally output the image data displaying the menu image on the full screen to the display device via the output terminal if the broadcast signals received by the tuner are those of SD broadcast, or if the menu-display-method setting data written into the memory is the menu-display-method setting data to display the menu image on the full screen.

According to a second aspect of the present invention, the above object is achieved by a digital broadcast receiver comprising: a selective receiving means for selectively receiving broadcast signals of a certain channel from digital broadcast signals coded and compressed by and transmitted from a broadcast station; a decoding means for decoding the broadcast signals received by the selective receiving means, and for outputting image data and audio data corresponding to the broadcast signals; a data storage means for storing various data including broadcast data having the image data and the audio data output from the decoding means; a menu image storage and output means for storing and outputting data of a menu image to be superimposed, for display, on a display image based on the image data; an input means for inputting various commands, including inputting a command for commanding to superimpose, for display, the menu image on the display image based on the image data; a synthesizing means for synthesizing the image data stored in the data storage means with the data of the menu image output from the menu image storage and output means so as to output a synthesized image data; an output means for outputting the synthesized image data, synthesized by the synthesizing means, to a display device such as a television receiver; and a control means for controlling the digital broadcast receiver in its entirety including the decoding means, the data storage means, the menu image storage and output means and the synthesizing means.

When the control means is commanded by the input means to superimpose, for display, the menu image on the display image based on the image data, the control means controls to be able to output an image data displaying the menu image in a sub-screen to the display device via the output means if the broadcast signals received by the selective receiving means are those of HD (High Definition) broadcast, while the control means controls to unconditionally output an image data displaying the menu image on a full screen to the display device via the output means if the broadcast signals received by the selective receiving means are those of SD (Standard Definition) broadcast.

Preferably, when the control means is commanded by the input means to superimpose, for display, the menu image on the display image based on the image data, the control means controls to output the image data displaying the menu image in the sub-screen to the display device via the output means if the broadcast signals received by the selective receiving means are those of HD broadcast, and if image format of the display device is one that has a resolution of 1080i (1080 interlaced) or higher, and further if screen size of the display device is 37 inch or larger.

Further preferably, the control means acquires, from the display device, information about the display device including the image format and the screen size, and stores the information of the image format and the screen size in the data storage means, wherein when the control means is commanded by the input means to superimpose, for display, the menu image on the display image based on the image data, the control means determines, based on the information of the image format and the screen size, whether or not the image format of the display device is one that has a resolution of 1080i or higher, and whether or not the screen size of the display device is 37 inch or larger.

It is also possible that the input means is used to input commands to select whether to display the menu image in the sub-screen or to display the menu image on the full screen: wherein the control means accepts input of a command to select to display the menu image in the sub-screen in the case where the image format of the display device is 1080i or higher; wherein the control means writes, into the data storage means, a menu-display-method setting data to display the menu image in the sub-screen in the case of accepting the input of the command, while the control means writes, into the data storage means, a menu-display-method setting data to display the menu image on the full screen in the case of not accepting the input of the command, and in the case where it is selected by the input means to display the menu image on the full screen; and wherein when the control means is commanded by the input means to superimpose, for display, the menu image on the display image based on the image data, the control means controls to output the image data displaying the menu image in a sub-screen to the display device via the output means if the broadcast signals received by the selective receiving means are those of HD broadcast, and if the menu-display-method setting data written into the data storage means is the menu-display-method setting data to display the menu image in the sub-screen, while the control means controls to unconditionally output the image data displaying the menu image on the full screen to the display device via the output means if the broadcast signals received by the selective receiving means are those of SD broadcast, or if the menu-display-method setting data-written into the data storage means is the menu-display-method setting data to display the menu image on the full screen.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 9 is a connected device information table stored in a memory of the set-top box;

DESCRIPTION OF THE PREFERRED EMBODIMENTS

The best modes and preferred embodiments of the present invention will be described hereinafter with reference to the annexed drawings. The specific embodiments described are not intended to cover the entire scope of the present invention, and hence the present invention is not limited to only the specific embodiments.

Figure 1:
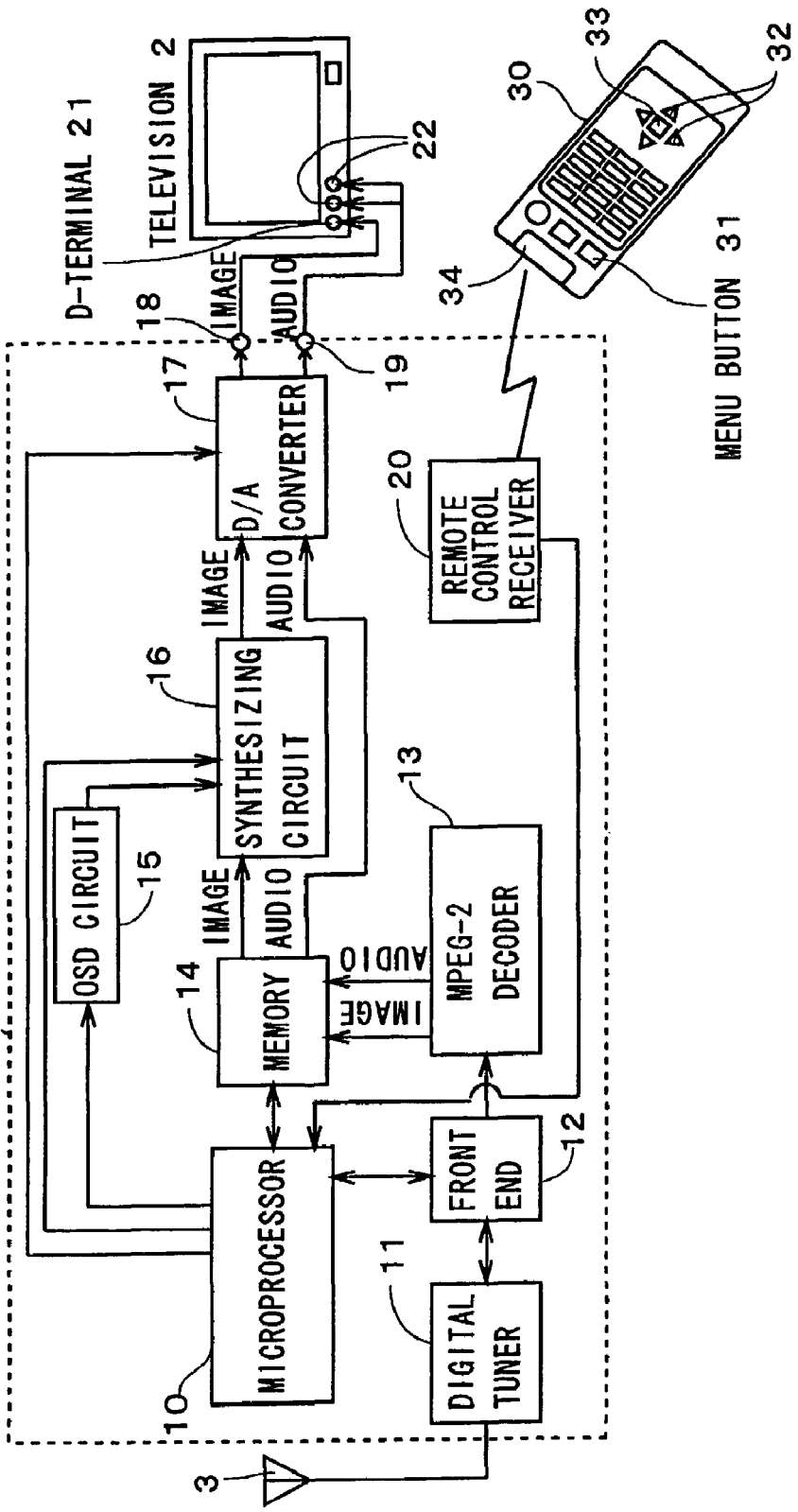
FIG. 1 is a schematic electric block diagram showing configuration of a set-top box according to a first embodiment of the present invention.

Before the description of the embodiments of the present invention, it is to be noted that like parts are designated by like reference numerals or reference characters throughout the drawings. A terrestrial digital broadcast receiver according to a first embodiment of the present invention is a device which receives, via an antenna, terrestrial digital broadcast signals transmitted from a terrestrial digital broadcast station, and which extracts video and audio signals of the terrestrial digital broadcast based on the received broadcast signals, and further which outputs, to a television receiver, image data and audio data based on the extracted video and audio signals. FIG. 1 shows a schematic configuration of a set-top box which is a terrestrial digital broadcast receiver according to the first embodiment. Connected to the set-top box 1 are: a television receiver 2 (hereafter referred to simply as "television") (claimed display device) to which image data and audio data extracted by the set-top box 1 are output; and an antenna 3 for receiving broadcast signals transmitted from a terrestrial digital broadcast station (hereafter referred to simply as "broadcast station").

The set-top box 1 comprises: a microprocessor 10 (control means) for controlling the digital broadcast receiver in its entirety; a digital tuner 11 (selective receiving means); a front end 12; an MPEG-2 (Moving Picture Experts Group-2) decoder 13 (decoding means); a memory 14 (data storage means); an OSD (On Screen Display) circuit 15 (menu image storage and output means); a synthesizing circuit 16 (synthesizing means); a D/A (Digital-to-Analog) converter 17; an image output terminal 18 (output means) for outputting image data; an audio output terminal 19 for outputting audio data; a remote control receiver unit 20; and a remote controller 30 (hereafter referred to simply as "remote control") (corresponding to claimed input device and input means).

The digital tuner 11 is a device for selectively receiving broadcast signals of a certain channel from the terrestrial digital broadcast signals coded and compressed by and transmitted from the broadcast station. The remote control 30 is an input device or input means for inputting various commands to the set-top box 1 as will be evident from the description hereinbelow. By tuning the receive frequency to a frequency corresponding to a channel selected using the remote control 30, the digital tuner 11 receives the terrestrial digital broadcast signals of the selected channel via the antenna 3. The signals output from the digital tuner 11 are TS (Transport Stream) signals formed by multiplexing a plurality of streams such as image (?video?) streams and audio streams.

The front end 12 separates and extracts, from the TS signals, image signals and audio signals of a television program in a sub-channel selected by the remote control 30, and outputs these signals to the MPEG-2 decoder 13. The MPEG-2 decoder 13 decodes the broadcast signals received by the digital tuner 11, and outputs image data and audio data corresponding to the broadcast signals. More specifically, the MPEG-2 decoder 13 decodes the image signals and the audio signals sent from the front end 12 into signals before digital compression coding, and outputs image data and audio data corresponding to the decoded signals to the memory 14. The memory 14 stores various data including broadcast data having the image data (broadcast image data) and the audio data sent from the MPEG-2 decoder 13.

The OSD circuit 15 stores data of menu images (hereafter sometimes referred to as "menu image data") for various settings, and sends the menu image data to the synthesizing circuit 16, under instruction of the microprocessor 10, synchronously with the transmission of the broadcast image data from the memory 14 to the synchronizing circuit 16. The synthesizing circuit 16 superimposes the menu image data sent from the OSD circuit 15 on the broadcast image data sent from the memory 14 so as to synthesize a broadcast image (namely an image data stored in the memory 14) with a menu image, and outputs the synthesized image data to the D/A converter 17. However, when the menu image data are not displayed by OSD, the microprocessor 10 outputs the broadcast image data stored in the memory 14 to the D/A converter 17.

The D/A converter 17 converts the sent image data and the audio data in digital format to image data and audio data in analog format, and outputs the converted image data and audio data to the television 2 via the image output terminal 18 and the audio output terminal 19. The image output terminal 18 and the audio output terminal 19 of the set-top box 1 are connected via cables to D-terminal 21 and an audio input terminal 22 of the television 2, respectively.

Provided on the remote control 30 are a menu button 31 to be used for displaying a menu image, and various keys such as four cursor keys 32 for performing various selections and a decision key 33 for deciding the selection. The remote control 30 sends infrared signals in accordance with the operation thereof by a user. The remote control receiver unit 20 receives the infrared signals sent from the remote control 30, and sends them to the microprocessor 10.

Figure 2:
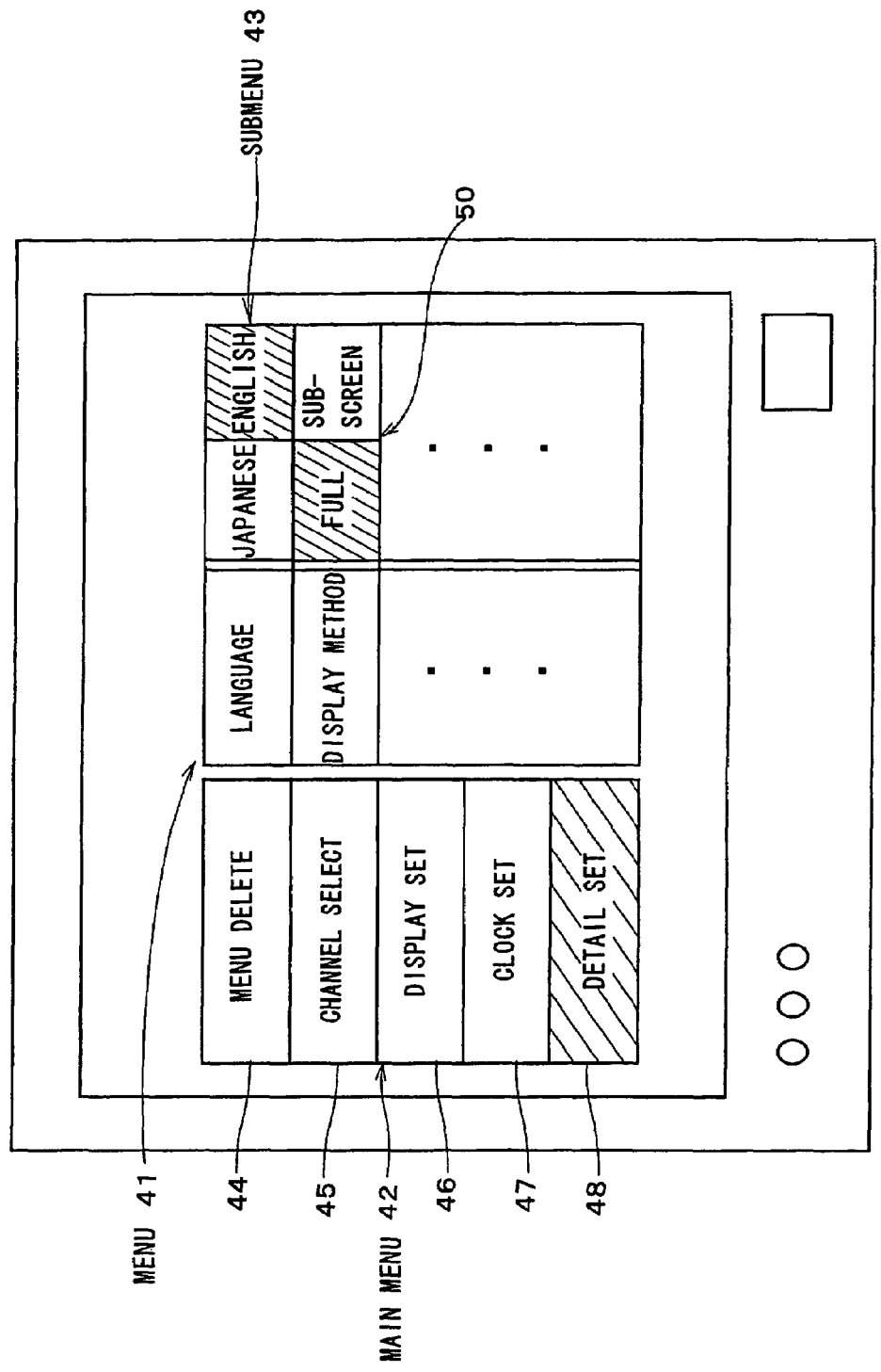
FIG. 2 is a schematic view of a display screen on a television connected to the set-top box, showing a menu displayed on a full screen.
Figure 3:
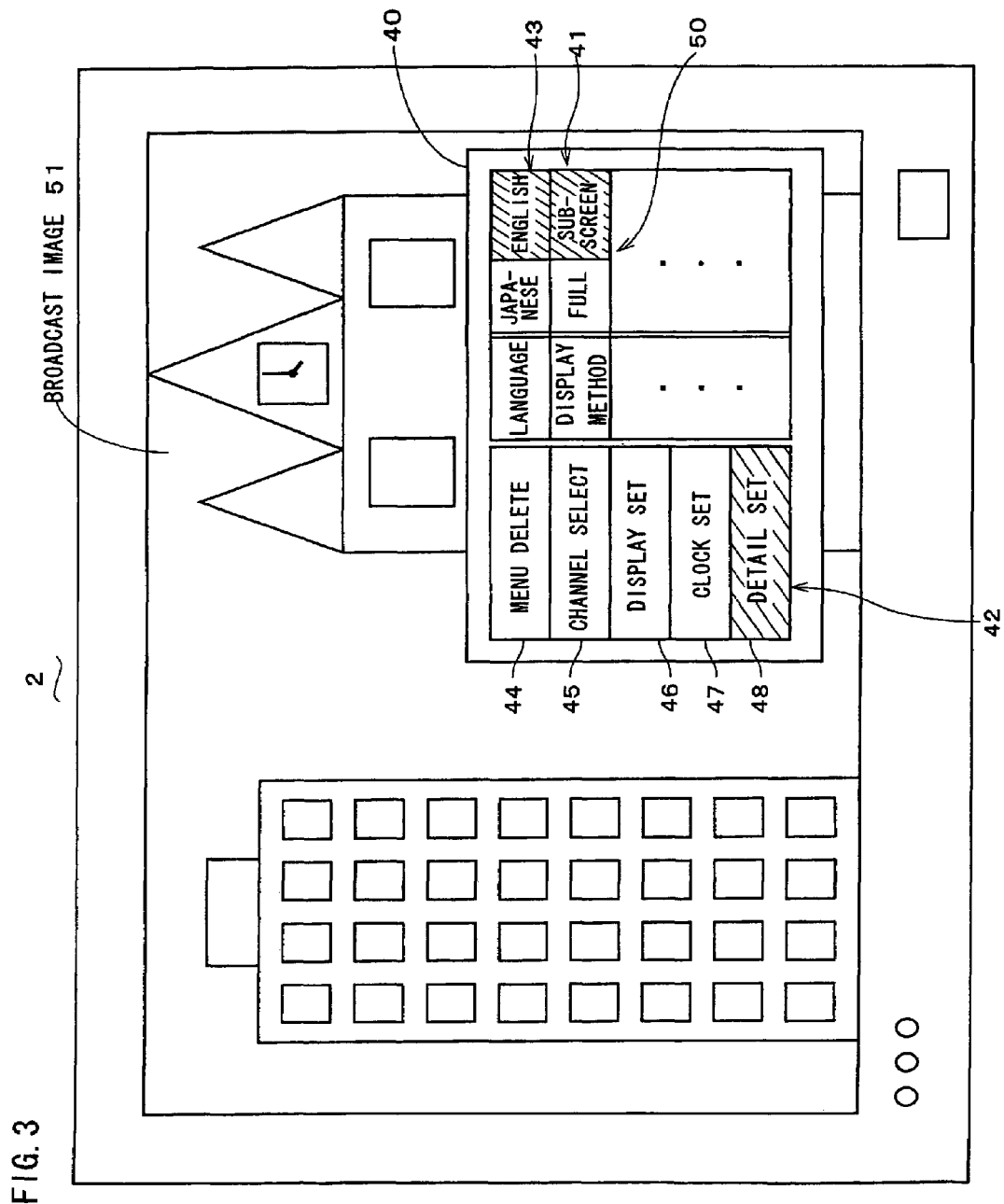
FIG. 3 is a schematic view of a display screen on the television connected to the set-top box, showing a menu displayed in a sub-screen.
Figures 4, 5:
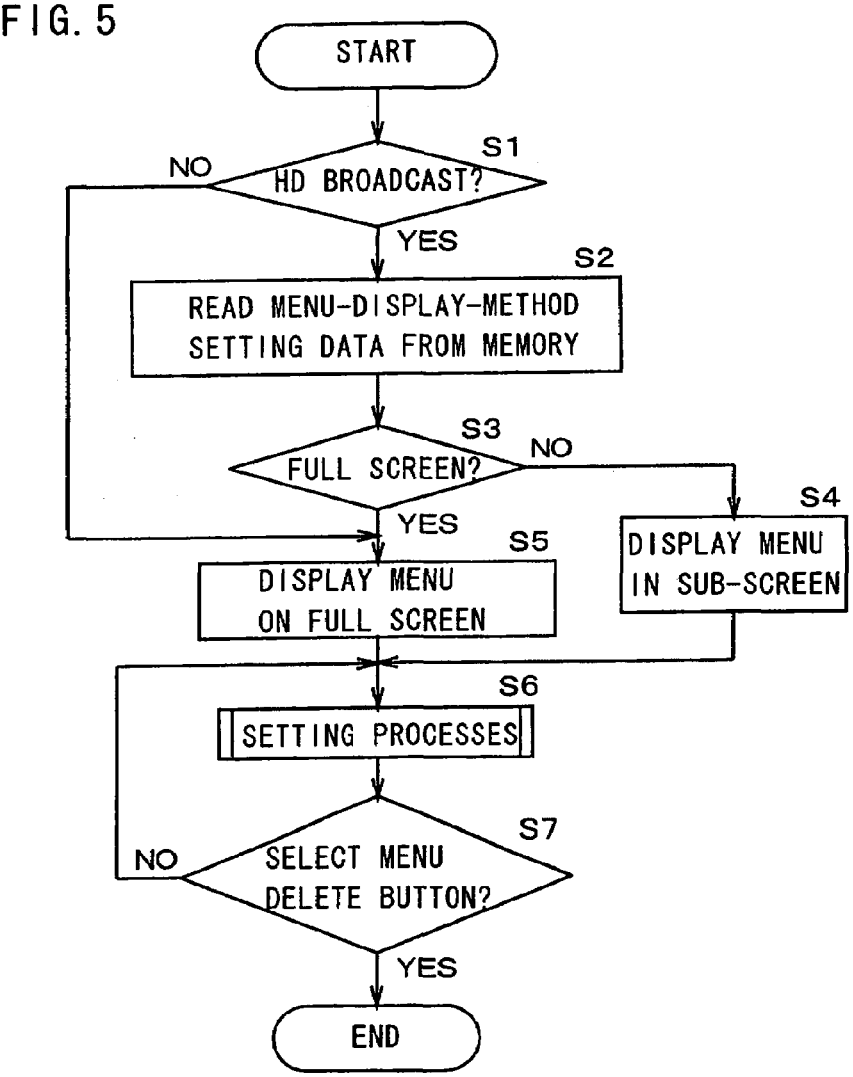
FIG. 4 is a table showing various image formats of the television.
FIG. 5 is a flow chart showing a process performed by the set-top box when it is commanded to display a menu.

Referring to FIG. 2 to FIG. 4, a method of displaying menu images according to the set-top box 1 will be described in the following. According to the set-top box 1, a user can input setting whether to display a menu image (hereafter referred to simply as "menu") 41 in a sub-screen 40 as shown in FIG. 3, which is a smaller screen superimposed on a full screen, or to display a menu 41 on a full screen as shown in FIG. 2, in the case where the television 2 is an HDTV (High Definition Television) for high resolution HD broadcast, namely where the image format of the television 2 is 1080i or any other one to produce higher resolution. In this case, the data of the input setting are written into the memory 14 by the microprocessor 10, in which such data of the input setting will be referred to as "menu-display-method setting data", and such process of the input setting will be referred to as "menu-display-method setting process".

On the other hand, in the case where the television 2 is an SDTV (Standard Definition Television) for low resolution SD broadcasts (for example in the case where the image format of the television 2 is 480i as shown in the table of FIG. 4), a user cannot input setting whether to display the menu 41 in the sub-screen 40 or to display the menu 41 on the full screen, but the menu 41 is unconditionally displayed on the full screen. In this case, the menu-display-method setting data to display the menu 41 on the full screen are written into the memory 14 by the microprocessor 10.

As described above, it is designed that a user can select whether to display the menu 41 in the sub-screen 40 or to display the menu 41 on the full screen, in the case where the image format of the television 2 is 1080i or any other one to produce higher resolution. This is because if the menu 41 is displayed in the sub-screen 40 as shown in FIG. 3 in the case where the television 2 is an SDTV for low resolution SD broadcasts, there is a possibility that characters in the menu become corrupted and unidentifiable.

Hereinafter, referring to the flow chart of FIG. 5, a process performed by the set-top box 1 will be described when it is commanded by the menu button 31 of the remote control 30 to display a menu. When the menu button 31 of the remote control 30 is pressed by a user, the microprocessor 10 of the set-top box 1 detects the pressing of the menu button 31 via the remote control receiver unit 20, and reads the menu-display-method setting data from the memory 14 (S2) if the broadcast signals received by the digital tuner 11 are those of an HD broadcast that is a high resolution broadcast (YES in S1). Then, in the case where the menu-display-method setting data is a setting data to display a menu 41 in a sub-screen 40 (NO in S3), the microprocessor 10 outputs, to the television 2, an image data displaying the menu 41 in the sub-screen 40 (S4). On the other hand, in the case where the menu-display-method setting data is a setting data to display a menu 41 on a full screen 40 (YES in S3), the microprocessor 10 outputs, to the television 2, an image data displaying the menu 41 on the full screen (S5).

The user performs various setting processes, including the menu-display-method setting process, in the menu 41 using e.g. the cursor keys 32 of the remote control 30 (S6). After completing the setting processes, the user selects menu delete button 44 as shown in FIG. 2 and FIG. 3, using the cursor keys 32 and the decision key 33 of the remote control 30. When the microprocessor 10 detects the selection of the menu delete button 44 (YES in S7) while the microprocessor 10 outputs, to the television 2, image data displaying the menu 41 on the full screen, the microprocessor 10 alternatively outputs, to the television 2, image data displaying a primary broadcast image on the full screen. On the other hand, if the microprocessor 10 is outputting, to the television 2, image data displaying the menu 41 in the sub-screen 40 at such time as shown in FIG. 3, the microprocessor 10 deletes the sub-screen 40 displaying the menu 41 from broadcast image 51, and alternatively outputs, to the television 2, image data displaying only a primary broadcast image on the full screen.

In the setting process shown in the above step S6, it is possible to perform a channel selection process, a display setting process, a clock setting process, and other various detail setting processes including the above menu-display-method setting process. More specifically, when the user selects a channel select button 45, a display set button 46, a clock set button 47 or a detail set button 48 in a main menu 42 shown in FIG. 2 and FIG. 3, using the cursor keys 32 and the decision key 33 of the remote control 30, the microprocessor 10 outputs, to the television 2, image data of the menu 41 including a submenu 43 which corresponds to the selected process content. When the user performs a process to input setting for a desired setting item from the setting items in the submenu 43 using the cursor keys 32 and the decision key 33 of the remote control 30, the microprocessor 10 writes the content of the input setting into the memory 14.

Figure 6:
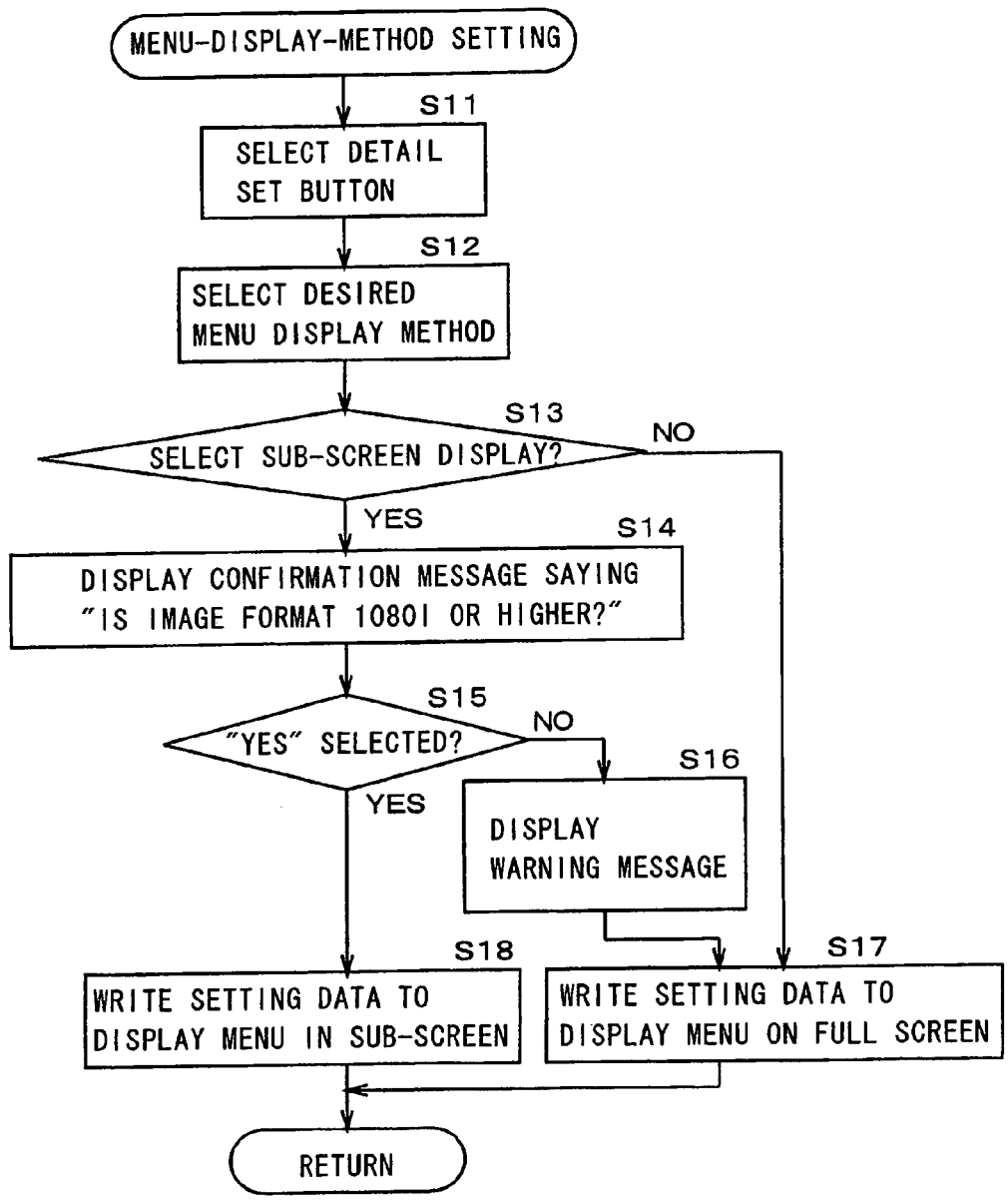
FIG. 6 is a flow chart showing a menu-display-method setting process.

Now, referring to the flow chart of FIG. 6 in addition to FIG. 2 and FIG. 3, the above menu-display-method setting process included in the above detail setting processes will be described below. When the user selects the detail set button 48 in the main menu 42 as shown in FIG. 2 and FIG. 3, using the cursor keys 32 and the decision key 33 (S11), the microprocessor 10 displays the submenu 43 for detail setting on the television 2. When the user selects a desired menu display method from menu display methods (sub-screen display and full screen display) selectable by a menu-display-method select button 50 in the submenu 43, using the cursor keys 32 and the decision key 33 (S 12), the microprocessor 10 displays, on the television 2, a confirmation message saying "Is the image format of the television 1080i or higher?" (S14), if the sub-screen display is selected (YES in S13).

If the user selects "YES" at this time using the remote control 30 (YES in S15), the microprocessor 10 writes, into the memory 14, a menu-display-method setting data to display a menu 41 in the sub-screen 40 (S18). On the other hand, if the user selects "NO" using the remote control 30 (NO in S15), the microprocessor 10 displays, on the television 2, a warning message saying "Cannot select sub-screen!" (S16), and writes into the memory 14 a menu-display-method setting data to display a menu 41 on the full screen (S17). This is because if the menu 41 is displayed in the sub-screen 40 in the case where the television 2 is that of low resolution image format such as 480i, there is a possibility that characters in the menu become corrupted and unidentifiable.

In other words, the microprocessor 10 accepts input of a command to select to display the menu 41 in the sub-screen 40 in the case where the image format of the television 2 is 1080i or higher, And the microprocessor 10 writes, into the memory 14, a menu-display-method setting data to display the menu 41 in the sub-screen 40 only in the case of accepting the input of the command, while the microprocessor 10 writes, into the memory 14, a menu-display-method setting data to display the menu 41 on the full screen in the case of not accepting the input of the command, and in the case where it is selected by the input device to display the menu 41 on the full screen.

Note here that in the process of selecting the menu display method as shown in the above step S12, the user sets the menu display method to be sub-screen display, only in the case where the image format of the television 2 is 1080i or higher that is a high resolution image format, and if the screen size of the television is large (for example 37 inch or larger). This is because, with these conditions fulfilled, it is possible to prevent the occurrence of a situation in which characters in the menu are corrupted, and the occurrence of a situation in which the characters are too small to be identifiable.

As described hereinabove, in the set-top box 1 according to the first embodiment of the present invention, it is designed that a user can select, in accordance with the screen size of the television 2, whether to display the menu 41 in the sub-screen 40, or to display the menu 41 on the full screen if the image format of the television 2, to which data are output, is 1080i or higher, namely if the television 2 is an HDTV for high resolution HD broadcast. Thereby, it becomes possible for the set-top box 1 to display the menu 41 in the sub-screen 40 on the television 2 if the resolution of images on the television 2 is high, and at the same time the screen size of the television 2 is large, namely if the user can identify characters in the menu 41 even when the television 2 displays the menu 41 in the sub-screen 40. Accordingly, the user can input setting of menu items as much as possible while watching the broadcast image 51. Furthermore, it is designed that the set-top box 1 displays the menu 41 on the full screen of the television 2 if the resolution of images on the television 2 is low, and the screen size of the television 2 is small, namely if there is a possibility that characters in the menu 41 become unidentifiable when the television 2 displays the menu 41 in the sub-screen 40. Accordingly, the characters in the menu can be prevented from becoming unidentifiable.

Figure 7:
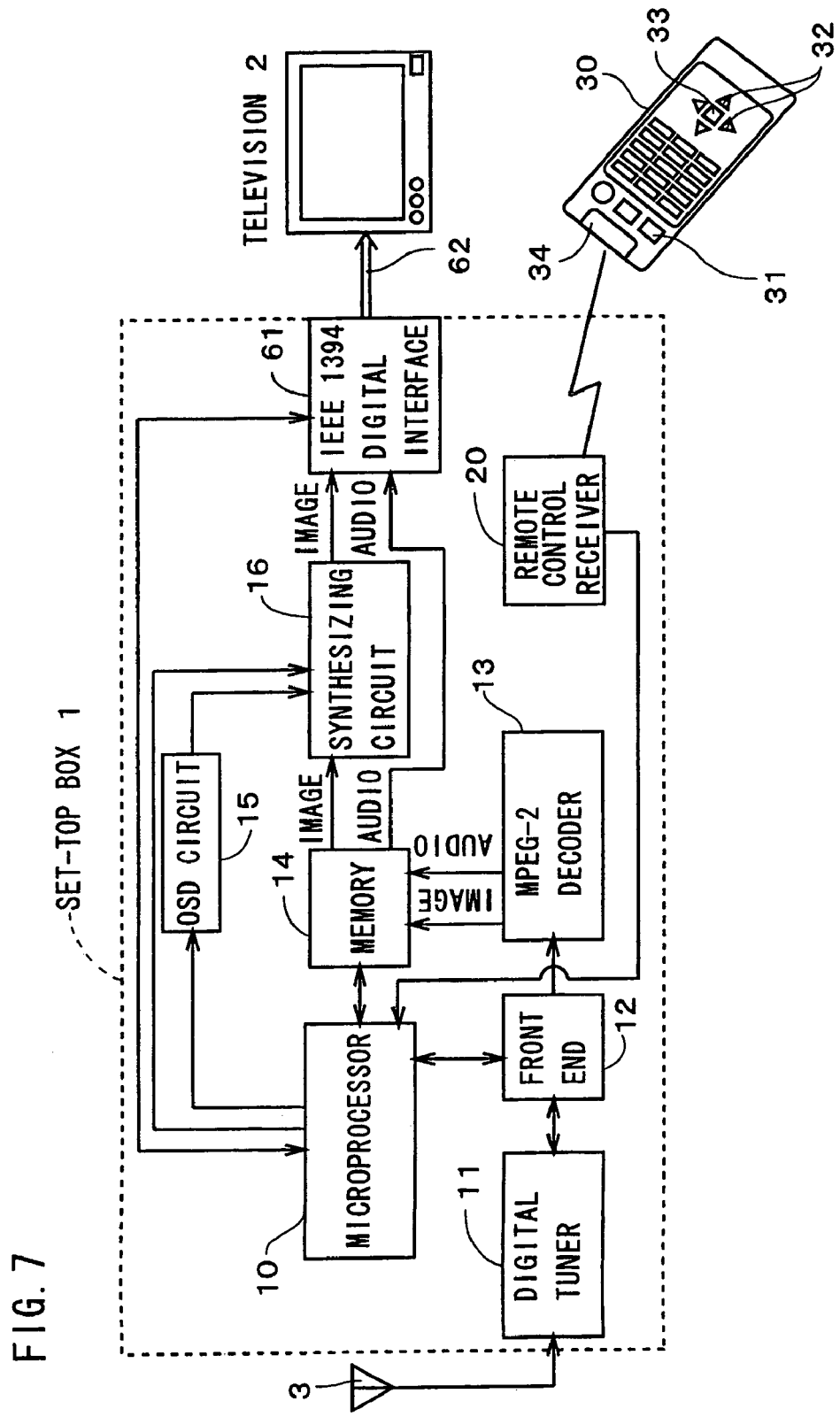
FIG. 7 is a schematic electric block diagram showing configuration of a set-top box according to a second embodiment of the present invention.

Hereinafter, a set-top box 1 according to a second embodiment of the present invention will be described. FIG. 7 shows a schematic configuration of a set-top box which is a terrestrial digital broadcast receiver according to the second embodiment. The set-top box 1 of the second embodiment has substantially the same configuration as that of the first embodiment, but comprises an IEEE (Institute of Electrical and Electronics Engineers) 1394 digital interface 61 which is connected to television 2 by an IEEE 1394 serial bus 62. The set-top box 1 and the television 2 according to the second embodiment can be designated as a controller device and a target device on the IEEE 1394 serial bus 62, respectively. Stored by a microprocessor 10 in memory 14 of the set-top box 1, as a controller device, is a connected device information table 70 (refer to FIG. 9), which lists information of connected devices, and which is created by editing based on various information acquired from the connected devices upon bus reset. If only the television 2, as a target device, is connected to the set-top box 1 as shown in FIG. 7, the connected device information table 70 stores GUID (Global Unique Identifier) 71 and device information 72 of only the television 2 including information about the screen size and image format of the television 2.

Figure 8:
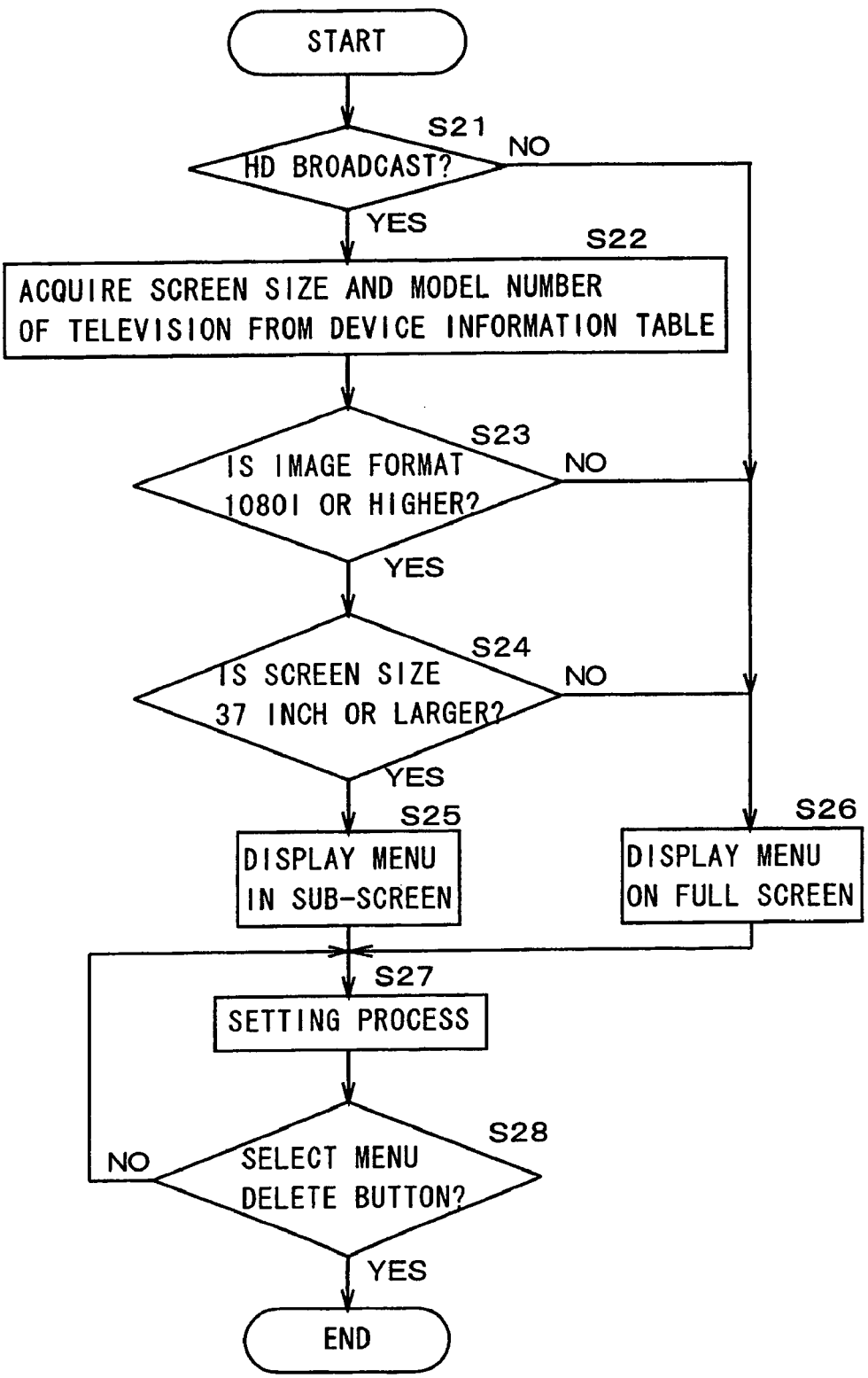
FIG. 8 is a flow chart showing a process performed by the set-top box when it is commanded to display a menu.

Next, referring to the flow chart of FIG. 8, a process performed by the set-top box 1 according to the second embodiment will be described when it is commanded by a menu button 31 of a remote control 30 to display a menu. When the menu button 31 of the remote control 30 is pressed by a user, a microprocessor 10 of the set-top box 1 detects the pressing of the menu button 31 via a remote control receiver unit 20, and reads the device information 72 about the television 2 as stored in the connected device information table 70 in the memory 14, and further acquires information of screen size and model number of the television 2 contained in the device information 72 (S22), if the broadcast signals received by a digital tuner 11 are those of an HD broadcast that is a high resolution broadcast (YES in S21).

Figure 10:
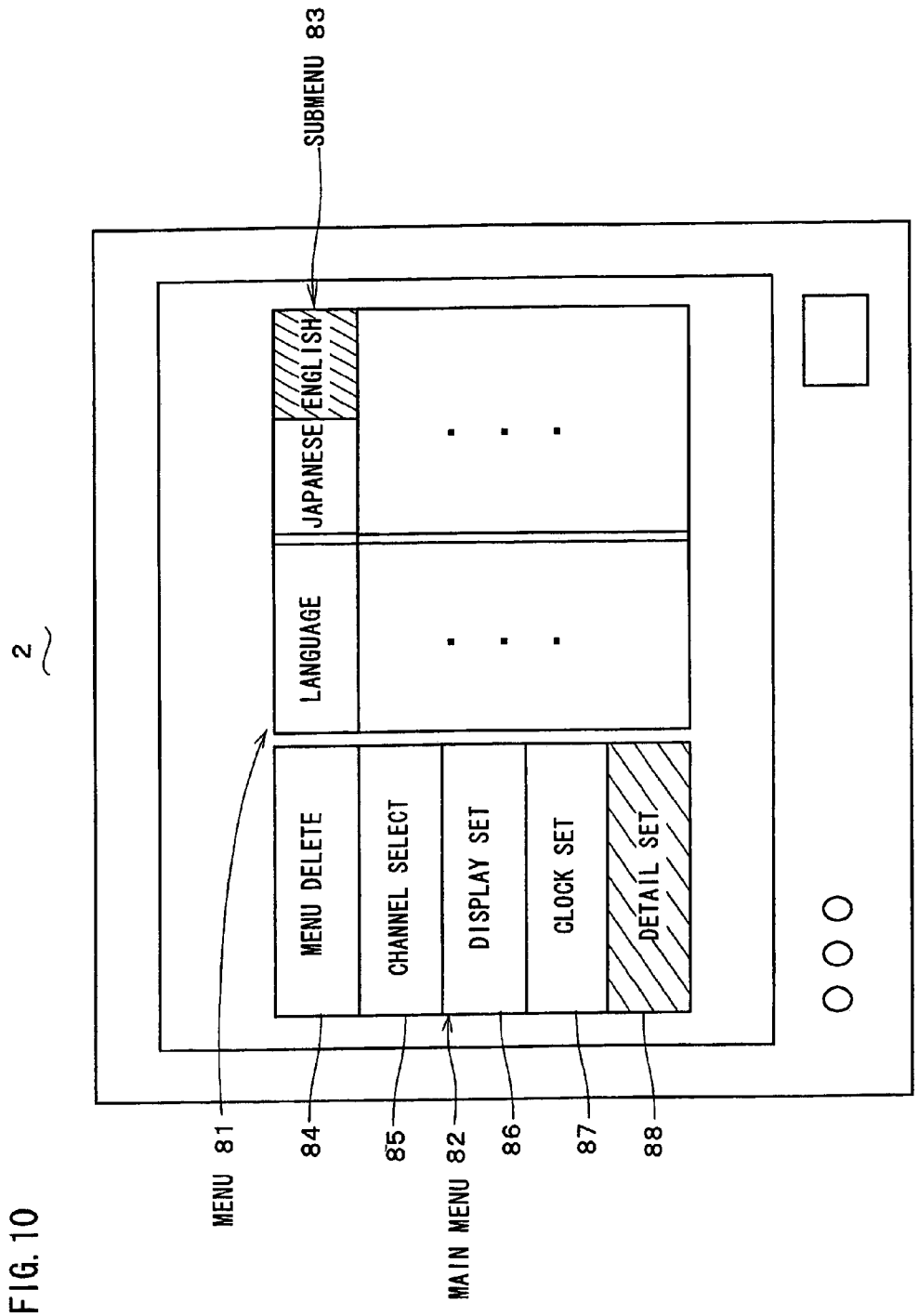
FIG. 10 is a schematic view of a display screen on the television connected to the set-top box, showing a menu displayed on a full screen.
Figure 11:
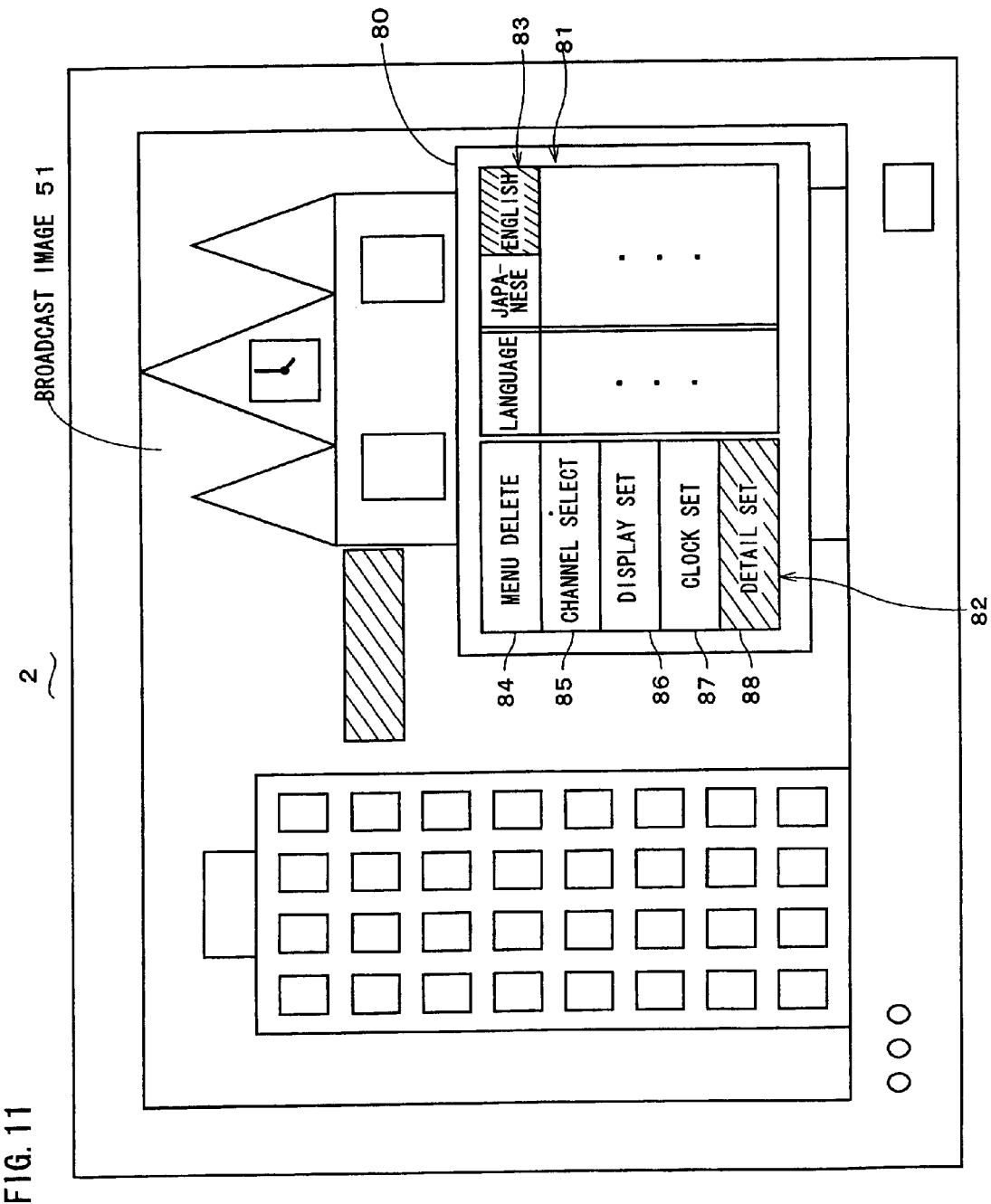
FIG. 11 is a schematic view of a display screen on the television connected to the set-top box, showing a menu displayed in a sub-screen.

Based on the acquired information of model number, the microprocessor 10 determines whether or not the image format of the television 2 is 1080i or higher (S23) and whether or not the screen size of the television 2 is that of 37 inch or larger (large size or not) (S24). If the determination indicates that the image format of the television 2 is 1080i or higher (YES in S23), and the screen size is that of 37 inch or larger (YES in S24), the microprocessor 10 outputs, to the television 2, an image data displaying menu 81 in a sub-screen 80 as shown in FIG. 11 (S25). On the other hand, if the determination indicates that the image format of the television 2 is less than 1080i (for example 480i) (NO in S23), or the screen size is smaller than 37 inch (NO in S24), the microprocessor 10 outputs, to the television 2, an image data displaying menu 81 on the full screen as shown in FIG. 10 (S26).

The user then performs various setting processes in the menu 81 using e.g. cursor keys 32 of the remote control 30 (S27). Note that the setting processes here do not include the menu-display-method setting process as shown in the flow chart of FIG. 6 above. After completing the setting processes, the user selects menu delete button 84 as shown in FIG. 10 and FIG. 11, using the cursor keys 32 and a decision key 33 of the remote control 30. After completing the setting processes, the user selects menu delete button 44 as shown in FIG. 2 and FIG. 3, using the cursor keys 32 and the decision key 33 of the remote control 30. When the microprocessor 10 detects the selection of the menu delete button 84 (YES in S28) while the microprocessor 10 outputs, to the television 2, image data displaying the menu 81 on the full screen, the microprocessor 10 alternatively outputs, to the television 2, image data displaying a primary broadcast image on the full screen. On the other hand, if the microprocessor 10 is outputting, to the television 2, image data displaying the menu 81 in the sub-screen 80 at such time as shown in FIG. 11, the microprocessor 10 deletes the sub-screen 80 displaying the menu 81 from broadcast image 51, and alternatively outputs, to the television 2, image data displaying only a primary broadcast image on the full screen.

As described hereinabove, the set-top box 1 according to the second embodiment of the present invention is designed to output, to the television 2, image data displaying the menu 81 in the sub-screen 80 when instructed by a user to display the menu 81: if the received broadcast signals are those of an HD broadcast, and if the image format of the television 2, to which data are output, is 1080i or higher, and further if the screen size of the television 2, to which data are output, is 37 inch or larger; namely if characters in the menu 81 are unlikely to be corrupted even when the television 2 displays the menu 81 in the sub-screen 80, and if there is no possibility that characters in the menu 81 become too small to be identifiable. Thereby, it becomes possible for the television 2 to display the menu 81 in the sub-screen 80 if the user can identify characters in the menu 81 even when the television 2 displays the menu 81 in the sub-screen 80. Accordingly, the user can input setting of menu items while watching the broadcast image.

In the above first and second embodiments, image formats other than 1080i and 480i have been hardly described. This is because the image formats actually used in the terrestrial digital broadcast are 1080i and 480i among the image formats shown in the table of FIG. 4. Among those in the table of FIG. 4, 1080p ("p" standing for progressive) is an image format for high resolution HD broadcast, while 480p is an image format for low resolution SD broadcast. Accordingly, if used for such progressive image formats, the set-top box 1 of each of the first and second embodiments is to perform processes similarly as in the case of the interlaced image formats. More specifically, if the image format of the television 2 is 480p, the set-top box 1 is to perform processes in a manner similar to that in the case where the image format of the television 2 is 480i. Likewise, if the image format of the television 2 is 1080p, the set-top box 1 is to perform processes in a manner similar to that in the case where the image format of the television 2 is 1080i.

It is to be noted that the present invention is not limited to the above embodiments, and various modifications are possible. For example, in the first embodiment of the present invention as described above, it is designed that a user inputs setting, in accordance with the screen size of the television 2, whether to display the menu 41 in the sub-screen 40 or to display the menu 41 on the full screen. However, it is also possible to design such that a user inputs, to a memory, settings of screen size and image format of a television connected to the set-top box, and that a microprocessor automatically determines whether to display a menu on a full screen, or to display the menu in a sub-screen based on the above setting. Furthermore, in the first embodiment described above, the process of setting a menu display method is performed using the cursor keys 32 and the decision key 33 of the remote control 30 together with the submenu 43 for detail setting. However, other processes of setting the menu display method can be used as well. In addition, in the second embodiment described above, the screen size of the television 2 is determined to be large in the case where the screen size is 37 inch or larger, and thus image data displaying the menu 81 in the sub-screen 80 is output to the television 2. However, other sizes than 37 inch can also be used as criteria for determining whether or not a screen size is large. Furthermore, while each of the first and second embodiments has been described with reference to a terrestrial digital broadcast receiver, it is apparent that the present invention is not limited thereto, and that the present invention is applicable to other digital broadcast receivers such as a BS digital broadcast receiver and a CS digital broadcast receiver.

This application is based on Japanese patent application 2004-1081 filed in Japan dated Jan. 6, 2004, the contents of which are hereby incorporated by reference.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A digital broadcast receiver comprising:
   a tuner for selectively receiving broadcast signals of a certain channel from digital broadcast signals coded and compressed by and transmitted from a broadcast station;
   a decoder for decoding the broadcast signals received by the tuner, and for outputting image data and audio data corresponding to the broadcast signals;
   a memory for storing various data including broadcast data having the image data and the audio data output from the decoder;
   an OSD (On Screen Display) circuit for storing and outputting data of a menu image to be superimposed, for display, on a display image based on the image data;
   an input device for inputting various commands, including inputting a command for commanding to superimpose, for display, the menu image on the display image based on the image data;
   a synthesizing circuit for synthesizing the image data stored in the memory with the data of the menu image output from the OSD circuit so as to output a synthesized image data;
   an output terminal for outputting the synthesized image data, synthesized by the synthesizing circuit, to a display device such as a television receiver; and
   a microprocessor for controlling the digital broadcast receiver in its entirety including the decoder, the memory, the OSD circuit and the synthesizing circuit,
   wherein the input device is used to input commands to select whether to display the menu image in the sub-screen or to display the menu image on the full screen, wherein the microprocessor accepts input of a command to select to display the menu image in the sub-screen in the case where the image format of the display device is 1080i or higher, wherein the microprocessor writes, into the memory, a menu-display-method setting data to display the menu image in the sub-screen in the case of accepting the input of the command, while the microprocessor writes, into the memory, a menu-display-method setting data to display the menu image on the full screen in the case of not accepting the input of the command, and in the case where it is selected by the input device to display the menu image on the full screen, and wherein when the microprocessor is commanded by the input device to superimpose, for display, the menu image on the display image based on the image data, the microprocessor controls to output the image data displaying the menu image in a sub-screen to the display device via the output terminal if the broadcast signals received by the tuner are those of HD (High Definition) broadcast, and if the menu-display-method setting data written into the memory is the menu-display-method setting data to display the menu image in the sub-screen, while the microprocessor controls to unconditionally output the image data displaying the menu image on the full screen to the display device via the output terminal if the broadcast signals received by the tuner are those of SD (Standard Definition) broadcast, or if the menu-display-method setting data written into the memory is the menu-display-method setting data to display the menu image on the full screen.

2. The digital broadcast receiver according to claim 1, wherein the digital broadcast receiver is a receiver for receiving terrestrial digital broadcast signals.

3. A digital broadcast receiver comprising:

a selective receiving means for selectively receiving broadcast signals of a certain channel from digital broadcast signals coded and compressed by and transmitted from a broadcast station;

a decoding means for decoding the broadcast signals received by the selective receiving means, and for outputting image data and audio data corresponding to the broadcast signals;

a data storage means for storing various data including broadcast data having the image data and the audio data output from the decoding means;

a menu image storage and output means for storing and outputting data of a menu image to be superimposed, for display, on a display image based on the image data;

an input means for inputting various commands, including inputting a command for commanding to superimpose, for display, the menu image on the display image based on the image data;

a synthesizing means for synthesizing the image data stored in the data storage means with the data of the menu image output from the menu image storage and output means so as to output a synthesized image data;

an output means for outputting the synthesized image data, synthesized by the synthesizing means, to a display device such as a television receiver; and a control means for controlling the digital broadcast receiver in its entirety including the decoding means, the data storage means, the menu image storage and output means and the synthesizing means, wherein the input means is used to input commands to select whether to display the menu image in the sub-screen or to display the menu image on the full screen, wherein the control means accents input of a command to select to display the menu image in the sub-screen in the case where the image format of the display device is 1080i or higher, wherein the control means writes, into the data storage means, a menu-display-method setting data to display the menu image in the sub-screen in the case of accepting the input of the command, while the control means writes, into the data storage means, a menu-display-method setting data to display the menu image on the full screen in the case of not accepting the input of the command, and in the case where it is selected by the input means to display the menu image on the full screen, and wherein when the control means is commanded by the input means to superimpose, for display, the menu image on the display image based on the image data, the control means controls to output the image data displaying the menu image in a sub-screen to the display device via the output means if the broadcast signals received by the selective receiving means are those of HD (High Definition) broadcast, and if the menu-display-method setting data written into the data storage means is the menu-display-method setting data to display the menu image in the sub-screen, while the control means controls to unconditionally output the image data displaying the menu image on the full screen to the display device via the output means if the broadcast signals received by the selective receiving means are those of SD (Standard Definition) broadcast, or if the menu-display-method setting data written into the data storage means is the menu-display-method setting data to display the menu image on the full screen.

4. The digital broadcast receiver according to claim 3, wherein the digital broadcast receiver is a receiver for receiving terrestrial digital broadcast signals.

* * * * *